Patented Mar. 16, 1948

2,437,955

UNITED STATES PATENT OFFICE 2,437,955

METHODS OF PRODUCING MOLDING COMPOUNDS COMPRISING FURFURYL ALCOHOL REACTION PRODUCTS

Herman I. Hersh, Toledo, Ohio, assignor to Owens-Illinois Glass Company, a corporation of Ohio No Drawing. Application March 9, 1944, Serial No. 525,794

5 Claims. (Cl. 260—17.4)

My invention relates to the production of organic molding materials of the thermosetting type adapted for molding under heat and pressure.

An object of the invention is to produce a molding powder from a mixture of furfuryl alcohol and a dicarboxylic acid, with a suitable filler, the materials being mixed wet and treated under heat and pressure by which a suitable reaction is produced, the compound being then ground to form a molding powder which may be molded under heat and pressure.

In accordance with my invention, the furfuryl alcohol may be mixed with and reacted by an unsaturated dicarboxylic acid or anhydride, as for example, maleic acid, maleic anhydride or fumaric acid, or a saturated dicarboxylic acid may be employed such as oxalic acid. Other polycarboxylic acids may be used.

The molding powder may be formed by a mixture of a filler, such as an enriched lignin cellulose and/or wood flour or other suitable filler, and a solution comprising from 3% to 10% of a dicarboxylic organic acid such as above specified, and 97% to 90% furfuryl alcohol. The solution is made by dissolving the acid into the alcohol with slight heating up to about 104° F. At this temperature no reaction has taken place. The cooled solution is added to the fillers and mixed therewith. This may be done in a Werner and Pfleiderer mixer or masticator or a Banbury mixer.

After mixing cold for a short time, such as one-half to one hour, the materials are removed and advanced on hot rolls or under heat and pressure in a Banbury mixer for from one-half to three minutes. The resulting material when ground to powder is suitable for use as a molding powder and is capable of fast curing under heat and pressure.

The usual practice in the manufacture of a molding compound is to mix the already formed resin with the fillers before the final compacting and advancement on the hot rolls or Banbury. Liquid resins are mixed with the filler in a suitable dough mixer or blender, or else hard solid resins are ground up and worked into an intimate mix with the fillers by ballmilling or blending prior to the compacting or advancement. In accordance with the present invention, the resins are formed, advanced, and the compound compacted all in the one operation on the hot rolls or Banbury. Excess or unreacted furfuryl alcohol acts as additional plasticizer in improving the flow of the final molding compound.

Percentages and proportions herein given are by weight.

An example of the method is as follows:

*Solution of catalyst and alcohol*

| | Parts |
|---|---|
| Furfuryl alcohol | 92.4 |
| Maleic anhydride | 7.6 |

The ingredients are mixed together and made into a solution by heating to about 104° F. with a small amount of stirring. The heating should not exceed this temperature.

*Molding powder*

| | Parts |
|---|---|
| The above solution | 47.6 |
| Enriched lignin cellulose | 51.0 |
| Carbon black | .9 |
| Zinc stearate | .5 |

The ingredients are blended in a masticator for one-half to one hour. The moist material is then advanced on differential rolls held, for example, at a temperature of 350° F. for one-half minute to three minutes. The temperature should be within a range of about 250° to 350° F., and the time required to advance the reaction to the desired degree will be from one-half to fifteen minutes. The resulting compound is hard and can be ground in a suitable disk grinder to form a molding powder. This material can be caused to set in a compression mold when subjected to pressure, and a temperature of 300° to 380° F. for fifteen to one hundred and eighty seconds.

Modifications may be resorted to within the spirit and scope of my invention.

I claim:

1. The method which comprises forming a resin solution by mixing together 94.4 parts furfuryl alcohol and 7.6 parts maleic anhydride, mixing together 47.6 parts of the solution, 51.0 parts lignin enriched lignocellulose, .9 part carbon black, and .5 part zinc stearate, blending the ingredients, raising the temperature of the mixture to 350° F., and advancing the mixture at said temperature for one-half minute to three minutes.

2. The method which comprises forming a resin solution by mixing together 94.4 parts furfuryl alcohol and 7.6 parts maleic anhydride, mixing together 47.6 parts of the solution, 51.0 parts lignin enriched lignocellulose, .9 part carbon black, and .5 part zinc stearate, blending the ingredients, raising the temperature of the mixture to 350° F., masticating the mixture while at said temperature until the reaction produces a compound which hardens on cooling, and grinding the compound to form a molding powder.

3. The method which comprises mixing furfuryl alcohol and a carboxylic compound of the group consisting of maleic acid, maleic anhydride, fumaric acid, and oxalic acid, thereby forming a solution, mixing the solution while in liquid form with a lignin enriched lignocellulose filler material before any substantial polymerization of the alcohol, heating the mixture to a temperature of from 250 degrees F. to 350 degrees F. and reacting the material while held at said temperature from ½ minute to 15 minutes.

4. The method which comprises, mixing together 90 to 97 parts furfuryl alcohol and 3 to 10 parts of a dicarboxylic compound of the group consisting of maleic acid, maleic anhydride, fumaric acid and oxalic acid, dissolving the compound into the alcohol by heating the mixture to a temperature not to exceed 104° F., cooling the solution, adding thereto a lignin enriched lignocellulose filler, mixing the ingredients, and thereafter subjecting the mixture to heat and pressure and thereby causing a polymerization of the material.

5. The method which comprises, mixing together 90 to 97 parts furfuryl alcohol and 3 to 10 parts of a dicarboxylic compound of the group consisting of maleic acid, maleic anhydride, fumaric acid and oxalic acid, dissolving the compound into the alcohol by heating the mixture to a temperature not to exceed 104° F., cooling the solution, adding thereto a lignin enriched lignocellulose filler, mixing the ingredients, heating the mixture to a temperature of 250° F. and maintaining the mixture at said temperature until the reaction has advanced to a degree to form a molding resin capable of being molded, polymerized and set or hardened under heat and pressure.

HERMAN I. HERSH.

REFERENCES CITED

The following references are of record in the file of this patent:

UNITED STATES PATENTS

| Number | Name | Date |
| --- | --- | --- |
| 2,243,481 | Meiler | May 27, 1941 |
| 2,325,570 | Katzen | July 27, 1943 |
| 2,335,701 | Root | Nov. 30, 1943 |
| 2,343,973 | Harvey | Mar. 14, 1944 |
| 2,345,966 | Fieldler | Apr. 4, 1944 |